May 10, 1966     E. A. STEINBOCK, JR     3,249,969
INVESTMENT MIXER WITH ENLARGED MOLD SUPPORTING PLATFORM
Filed April 17, 1963
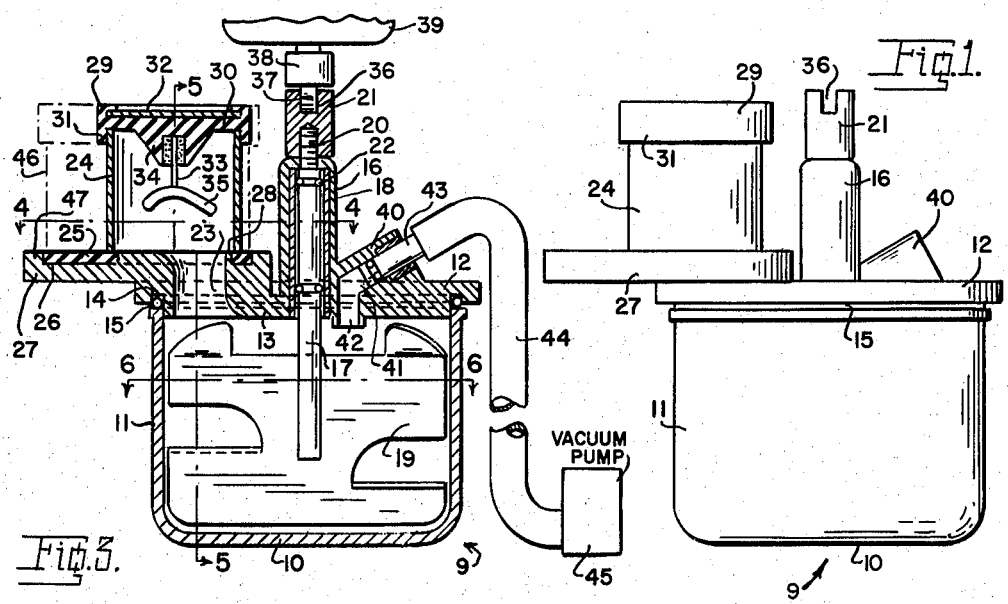
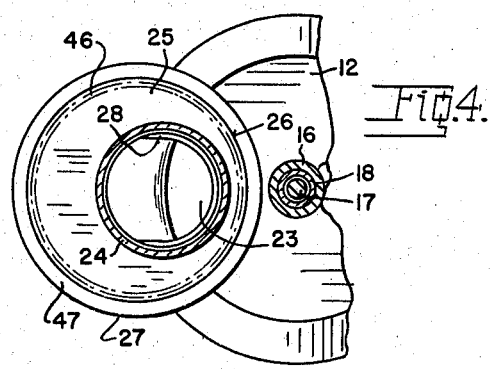
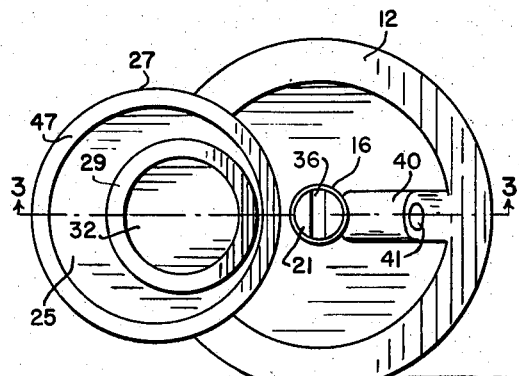
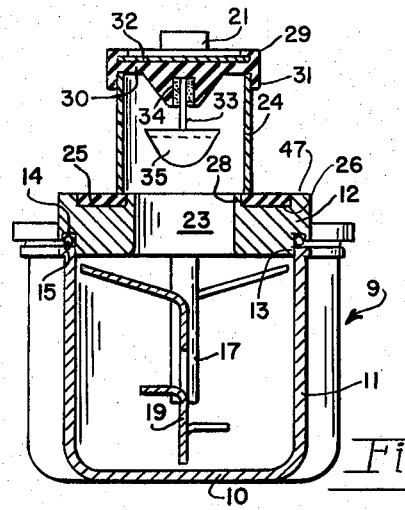
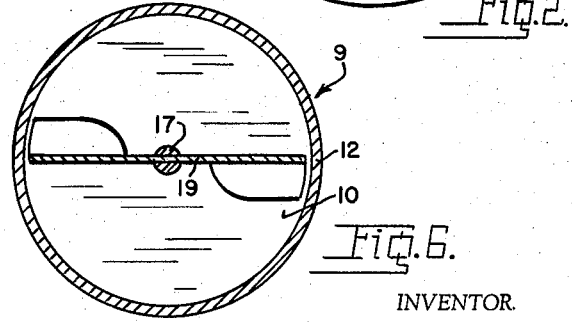
INVENTOR.
EDMUND A. STEINBOCK, JR.
BY
Joseph A. Rave
Attorney

United States Patent Office 3,249,969
Patented May 10, 1966

3,249,969
INVESTMENT MIXER WITH ENLARGED MOLD
SUPPORTING PLATFORM
Edmund A. Steinbock, Jr., Louisville, Ky., assignor to Whip-Mix Corporation, Louisville, Ky., a corporation of Kentucky
Filed Apr. 17, 1963, Ser. No. 273,700
5 Claims. (Cl. 22—9)

This invention relates to improvements in an investment mixer, that is, a mixer such as employed in the mixing of ingredients for providing a casting mold forming investment.

Mixers, such as herein disclosed, are well-known in so far as the general assembly is concerned. Mixers, as heretofore known were limited in their use in that they were confined to the mixing of a relatively small quantity of ingredients for providing a relatively small quantity of investment material and were therefore confined to the use of equipment that could use only relatively small mold forming members, rings, or the like.

The present invention materially extends the use of the mixer, that is, permits the use of various sizes of mold forming rings, starting where the mixers of the past stopped.

The principal object of the present invention, therefore, is the provision of an improved investment mixer whereby selective relatively larger quantities of investment can be readily and expeditiously produced.

Another object of the present invention is the provision of an investment mixer capable of forming molds of a plurality of sizes, that is, selectively using casting rings, mold forming members, of different sizes depending on the size of the pattern.

A still further object of the present invention is the provision of an investment mixer for particular use in mixing an investment material under vacuum.

A further object of the present invention is the provision of a mixer for accomplishing the foregoing objects that can be economically produced and acquired.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 1 is an elevational view of an investment mixer embodying the principles of the present invention.

FIG. 2 is a top plan view of the investment mixer of FIG. 1.

FIG. 3 is a vertical central sectional view through the investment mixer as seen from line 3—3 on FIG. 2.

FIG. 4 is a horizontal sectional view through a portion of the investment mixer as seen from line 4—4 on FIG. 3.

FIG. 5 is a staggered, vertical, sectional view through the investment mixer as seen from line 5—5 on FIG. 3.

FIG. 6 is a horizontal sectional view through the container of the investment mixer as seen from line 6—6 on FIG. 3 taken through a plane below that of FIG. 4.

Throughout the several views of the drawings similar reference characters are employed to denote the same or similar parts.

As was noted above mold forming investment mixers are generally old and well-known and find, in so far as the device disclosed in this application is concerned, their principal use in dentistry. In dentistry and in forming or making a dental restoration a disposable pattern, generally wax, is accurately made or formed to the size and shape of the dental restoration to be made, whereupon the said wax pattern is utilized to form a mold cavity within a mold generally made of a form of plaster of Paris.

In forming the mold the dry plaster of Paris, a binder, is mixed with a filler, generally a silica, a control element or elements for effecting or controlling the setting time of plaster of Paris and the normal and thermal expansion and contraction thereof and an aqueous material, generally water. The device of the present invention, a mixer and mold former, is employed for the mixing of these ingredients which subsequently result in the casting mold.

The device of the present invention as disclosed in the drawings comprises a bowl, cup, or container, indicated as a whole by the reference numeral 9, and having a bottom 10 from the periphery of which upstands the wall 11. Preferably, the said container is circular in plan as most clearly illustrated in FIG. 6.

Disposed on the upper, open end of the container is a cover 12 slightly larger in diameter than the container and is provided with a depending boss-like portion 13 to enter and centralize the container with relation thereto. Substantially immediately adjacent the said boss 13, the cover is provided with an upwardly disposed groove 14 receiving a gasket 15 conveniently in the form of an O-ring.

Upstanding from the cover 12, substantially centrally of the container and therefore the cover, is a post 16 housing the mixer shaft 17. Since the container 9 and the cover 12 are formed of synthetic resin, plastic, the post 16 is formed around a metal sleeve 18 through which the shaft 17 passes. The shaft 17 projects into the container 9 and has secured thereto a mixing paddle or blade 19. The attachment of the shaft 17 to the paddle or blade 19 may take any suitable or desirable form, that shown in the drawings consisting in providing the free end of the shaft 17 with a slot of the width of the blade material to receive said blade and be welded, brazed or the like in position.

The shaft 17 is provided at its upper end with a threaded reduced portion 20 to receive or have threaded thereto a driven head 21 and whereby the said shaft 17 and mixing paddle or blade 19 are rotated. In addition, and for a purpose subsequently to be made obvious, the shaft 17 is provided within the sleeve with sealing O-rings 22.

The cover 12 is provided laterally and to one side of the post 16 with an opening 23 through which the ingredients of the container 9 is discharged into a mold forming member or ring 24 which, as is well known, conveniently takes the form of a sleeve open at both ends and generally referred to, in the trade, as a "casting ring." The mold forming sleeve 24 has its one or filling end disposed on a relative soft member or platform 25, conveniently in the form of a soft flat rubber gasket disposed in a counterbore 26 in a ledge or platform 27 integral with and laterally projecting from the container cover 12. The opening 23 through the container cover 12 is also formed through the platform 27 as clearly illustrated in FIG. 3.

As most clearly illustrated in FIG. 4 the platform 27 is circular in plan and has its center offset or eccentric to the axis of the container cover 12 and while the counterbore 26, for the compressible member platform 25, is concentric with the platform 27 the opening 23 is eccentric to said platform and is provided therearound with an upstanding circular boss 28 exteriorally of which the mold forming sleeve or casting ring 24 is positioned, as will presently be made clear. From the foregoing it will be noted that the platform has a portion thereof over the container cover and remaining portion thereof outwardly of the said cover.

The mold forming member, casting ring, has its other or upper end closed by a crucible former and sprue pin carrier 29 all as is well-known. Generally, a crucible former and sprue pin carrier is formed of rubber and includes a body portion 30 from the periphery of which depends a flange or rim 31 to yieldably engage the end of the mold forming member, sleeve, or casting ring 24. The said crucible former and sprue pin carrier body portion 30 has let into it from one side thereof a metal plate 32 and has projecting from its other side a conical protuberance 34 which, as is well-known, provides the crucible in the subsequently formed mold. At the same time the conical protuberance 34 removably supports the sprue pin 33 which carries at its outer end the pattern 35, which as noted above, is generally formed of dissipatable wax.

In practice the dry, powder investment materials including the binder, filler and control elements together with the water, supra, in the desirable and necessary quantity are placed in the container 9 and the mixing paddle inserted into the ingredients whereupon the mixing blade or paddle is rotated to adequately and properly spatulate or mix the said ingredients. Either prior to or after the said mixing or spatulation the mold forming sleeve or ring, after having had attached thereto the crucible former and sprue pin carrier and its attached pattern, is placed around the discharge opening 23, there is, around the boss 28, whereupon the mixer is tilted to cause a flow of the mixed investment material into the said mold forming sleeve or ring 24 for completely embedding the pattern 35, the sprue pin 33 and conical protuberance or projection 34. The parts may then be separated and the mold forming investment allowed to harden.

In practice the mixer shaft 17 and mixing blade or paddle 19 are power rotated wherefore the driven head 21 is provided with a kerf or slot 36 receiving a driving key 37 from a driving member 38 secured to the shaft of an electric motor, dental engine, or the like, illustrated in the drawing by one end thereof and identified by the reference numeral 39.

The mold forming sleeve is held in tight or sealing engagement with its platform or support and preferably, also, the mixing of the ingredients within the container or cup 9 is effected while the same is under negative pressure or within a vacuum. In order to accomplish this the container cover 12 is provided laterally of the post 16 with a boss 40 having formed therethrough an opening or port 41 terminating in a downward port 42 into the interior of the container or cup. Connected through a removable connector 43 with the ports or passageways 41–42 is a flexible tube or conduit 44 that terminates in a vacuum pump 45, diagrammatically illustrated in the drawings since such a pump is well-known.

In practice and prior to the operation of the mixer shaft motor 39 the vacuum pump 45 is operated which upon creating a negative pressure within the container also evacuates the interior of the mold forming ring 24 and at the same time acting on the crucible former and sprue pin carrier body portion 30 pulls the said casting ring against the compressible platform 25 pressing the open free end of the mold forming ring into the compressible platform for effecting a seal between these parts. After the ingredients have been desirably mixed and before the vacuum pump is rendered inoperative the said mixed ingredients, the invest material, is poured into the said mold forming sleeve 24 by way of the discharge opening 23.

In proportion to the size of the parts shown in the drawings, the smallest diameter mold forming sleeve that can be used is illustrated in full lines in the drawings, and identified by the reference numeral 24, but it should be noted that larger mold forming sleeves as illustrated in phantom lines in FIGS. 3 and 4 and identified by the reference numeral 46, up to the diameter of the said compressible platform 25, may be employed. Obviously mold forming sleeves having a size or diameter between that indicated at 24 and that indicated at 46 may be employed, the only requirement being that the end thereof against the flexible platform 25 being outside of the boss 28 and inside of the counterbore rim 47.

From the foregoing it will be noted that there has been provided an investment mixer for mixing different quantities of investment for various sizes of mold forming sleeves as conditions and desires dictate.

What is claimed is:

1. In a mixer of the class described the combination of a container, a cover for the container, a rotatable mixing blade within the container, a shaft rotatably carried by the cover projecting into the container and having connected therewith the mixing blade, said cover and container being substantially coextensive in area in plan, a supporting platform carried by the cover having a portion thereof overlying the cover and a portion extending beyond the cover, said overlying portions of the platform and cover having formed therethrough a discharge opening from the container wherefore said opening is eccentric to the cover and platform, said platform having a concentric recess and a boss substantially concentric with the discharge opening, upstanding from said recess bottom, a compressible member in said platform recess radially of the boss, and a mold forming ring including a wall of appreciable thickness and having one end closed to support a pattern within the ring, said ring having its other end open and said ring having an internal diameter greater than the diameter of the discharge opening boss and an external diameter smaller than the platform recess with its open end disposed on said compressible member with said open end internal diameter receiving the platform discharge opening boss and the ring outside diameter within the platform recess.

2. In a mixer of the class described the combination of a container, a cover for the container, a rotatable mixing blade within the container, a shaft rotatably carried by the cover projecting into the container and having connected therewith the mixing blade, said cover and container being substantially coextensive in area in plan, a supporting platform carried by the cover having a portion thereof overlying the cover and a portion extending beyond the cover, said overlying portions of the platform and cover having formed therethrough a discharge opening from the container wherefore said opening is eccentric to the cover and platform, said platform having a concentric recess and a boss substantially concentric with the discharge opening upstanding from said recess bottom, a compressible member in said platform recess radially of the boss, a mold forming ring including a wall appreciable thickness and having one end closed to support a pattern within the ring, said ring having its other end open and said ring having an internal diameter greater than the diameter of the discharge opening boss and an external diameter smaller than the platform recess with its open end disposed on said compressible member with said open end internal diameter receiving the platform discharge opening boss and the ring outside diameter within the platform recess, and means holding the mold forming ring against the compressible platform surface compressing the same and effecting a seal between the mold forming ring and compressible platform surface.

3. In a mixer of the class described the combination of a container, a cover for the container, a rotatable mixing blade within the container, a shaft rotatably carried by the cover projecting into the container and having connected therewith the mixing blade, said cover and container being substantially coextensive in area in plan, a supporting platform carried by the cover having a portion thereof overlying the cover and a portion extending beyond the cover, said overlying portions of the platform and cover having formed therethrough a discharge opening from the container wherefore said opening is eccentric to the cover and platform, said platform having a concentric recess and a boss substantially concentric with the discharge opening upstanding from said recess bottom, a compressible member in said platform recess radially of the boss, a mold forming ring including a wall of appreciable thickness and having one end closed to support a pattern within the ring, said ring having its other end open and said ring having an internal diameter greater than the diameter of the discharge opening boss and an external diameter smaller than the platform recess with its open end disposed on said compressible member with said open end internal diameter receiving the platform discharge opening boss and the ring outside diameter within the platform recess, and means connected with the interiors of the container and mold forming ring for creating a negative pressure therein for holding the mold forming ring against the compressible platform surface and effecting a seal therebetween.

4. In a mixer of the class described the combination of a container, a cover for the container, a rotatable mixing blade within the container, a shaft rotatably carried by the cover and including a portion above the cover and a portion projecting into the container and having connected therewith the mixing blade, said cover and container being substantially coextensive in area, said cover including a portion extending laterally thereof beyond the container and inwardly of the container to a point short of the mixer shaft and with said portion of the cover forming a supporting platform, said cover supporting platform portion inwardly of the container having formed therethrough an opening to the interior of the container wherefore said opening is eccentric to said cover platform portion, a compressible surface on said cover platform portion apertured to coincide with the opening in said cover platform portion, a mold forming ring having a wall of appreciable thickness and an internal diameter at least to encompass the cover platform portion opening and with the mold forming ring end on the cover platform portion compressible surface encircling said opening and with a portion of said mold forming ring end between the shaft and adjacent edge of the opening, said mold forming ring having an external diameter to be within the outer edge of the cover platform forming portion compressible surface to be concentric with and eccentric to the cover platform forming portion and with the said entire open end of the ring in contact with the cover platform forming portion compressible supporting surface, means closing the other end of the casting ring, and means pressing the said open end of the casting ring into the cover platform compressible surface to form a seal therebetween.

5. In a mixer of the class described the combination of a container, a cover for the container, a rotatable mixing blade within the container, a shaft rotatably carried by the cover and including a portion above the cover and a portion projecting into the container and having connected therewith the mixing blade, said cover and container being substantially coextensive in area, said cover including a portion extending laterally thereof beyond the container and inwardly of the container to a point short of the mixer shaft and with said portion of the cover forming a supporting platform, said cover supporting platform portion inwardly of the container having formed therethrough an opening to the interior of the container wherefore said opening is eccentric to said cover platform portion, a compressible surface on said cover platform portion apertured to coincide with the opening in said cover platform portion, a mold forming ring having a wall of appreciable thickness and an internal diameter at least to encompass the cover platform portion opening and with the mold forming ring end on the cover platform portion compressible surface encircling said opening and with a portion of said mold forming ring end between the shaft and adjacent edge of the opening, said mold forming ring having an external diameter to be within the outer edge of the cover platform forming portion compressible surface to be concentric with and eccentric to the cover platform forming portion and with the said entire open end of the ring in contact with the cover platform forming portion compressible supporting surface, means closing the other end of the casting ring, and means connected with the interiors of the container and mold forming ring for creating a negative pressure therein for holding the open end of the mold forming ring against the cover forming portion compressible surface and effecting a seal therebetween.

References Cited by the Examiner
UNITED STATES PATENTS

| | | | |
|---|---|---|---|
| 2,685,718 | 8/1954 | Schmitz | 22—57.1 |
| 2,696,022 | 12/1954 | Steinbock et al. | 18—5.7 |
| 2,777,177 | 1/1957 | Steinbock et al. | |

J. SPENCER OVERHOLSER, *Primary Examiner.*

R. F. WHITE, MARCUS U. LYONS, R. D. BALDWIN,
*Examiners.*